(12) United States Patent
Wilkinson et al.

(10) Patent No.: US 8,192,060 B2
(45) Date of Patent: Jun. 5, 2012

(54) AIRCRAFT NAVIGATION LIGHT

(76) Inventors: Dean Andrew Wilkinson, Boise, ID (US); Nathan Howard Calvin, Boise, ID (US)

( * ) Notice: Subject to any disclaimer, the term of this patent is extended or adjusted under 35 U.S.C. 154(b) by 497 days.

(21) Appl. No.: 12/508,450

(22) Filed: Jul. 23, 2009

(65) Prior Publication Data
US 2011/0019430 A1    Jan. 27, 2011

(51) Int. Cl.
*B64D 47/02* (2006.01)

(52) U.S. Cl. ........ 362/470; 362/231; 362/247; 362/248; 362/249.02; 362/311.02; 362/545; 340/815.45

(58) Field of Classification Search ............ 362/231, 362/243, 247, 248, 249.02–249.06, 311.02, 362/470–472, 545; 340/815.45
See application file for complete search history.

(56) References Cited

U.S. PATENT DOCUMENTS

| | | |
|---|---|---|
| 1,430,580 A | 10/1922 | Old |
| 4,929,866 A | 5/1990 | Murata |
| 4,964,025 A | 10/1990 | Smith |
| 5,528,474 A | 6/1996 | Roney et al. |
| 6,045,240 A | 4/2000 | Hochstein |
| 6,318,886 B1 | 11/2001 | Stopa et al. |
| 6,328,456 B1 | 12/2001 | Mise |
| 6,461,029 B2 | 10/2002 | Gronemeier et al. |
| 6,481,130 B1 | 11/2002 | Wu |
| 6,507,290 B1 | 1/2003 | Lodhie et al. |
| 6,641,284 B2 | 11/2003 | Stopa et al. |
| 6,644,841 B2 | 11/2003 | Martineau |
| 6,851,835 B2 | 2/2005 | Smith et al. |
| 6,994,459 B2 | 2/2006 | Worsdell et al. |
| 7,008,079 B2 | 3/2006 | Smith |
| 7,021,801 B2 | 4/2006 | Mohacsi |
| 7,055,994 B2 | 6/2006 | Martin |
| 7,236,105 B2 | 6/2007 | Brenner et al. |
| 7,245,203 B2 | 7/2007 | Stephens et al. |
| 7,314,296 B2 | 1/2008 | Machi et al. |
| D592,780 S | 5/2009 | Calvin et al. |
| 7,918,592 B2 * | 4/2011 | Barnett et al. ................ 362/470 |
| 2002/0149944 A1 * | 10/2002 | Worsdell et al. ............. 362/470 |
| 2005/0093718 A1 | 5/2005 | Martin |
| 2009/0085503 A1 * | 4/2009 | Narita et al. .................. 315/309 |

* cited by examiner

*Primary Examiner* — Stephen F Husar
(74) *Attorney, Agent, or Firm* — Gerard Carlson

(57) ABSTRACT

An aircraft navigation light comprises a base and circuit board in thermal contact with the base. White and colored LEDs mount on the circuit board. A reflector-shade placed adjacent the LEDs reflects light from the LEDs in desired directions and shades other directions from view of selected LEDs. A light transmissive cover sealed to the base, encloses the circuit board, LEDs and reflector-shade. Temperature responsive circuitry on the circuit board regulates the current through the LEDs and reduces the LED current under high temperature conditions.

19 Claims, 12 Drawing Sheets

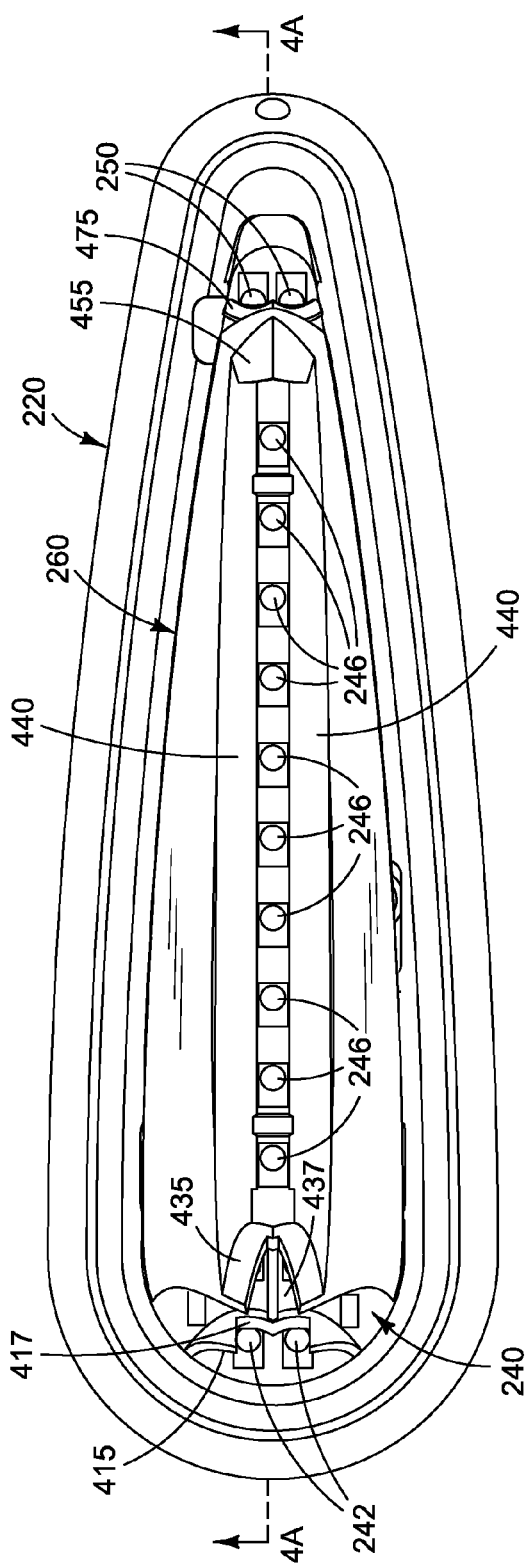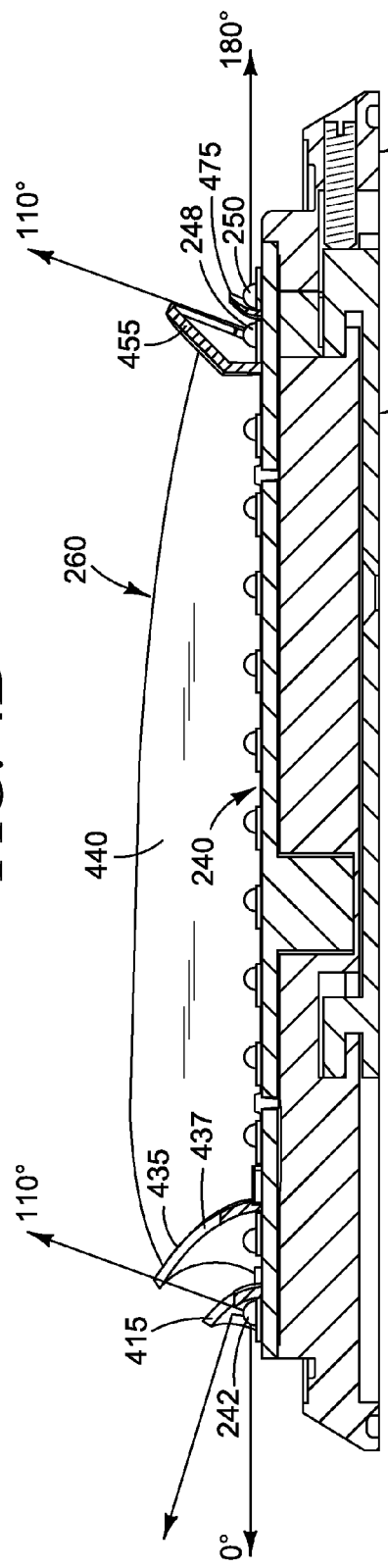
FIG. 4B
FIG. 4A

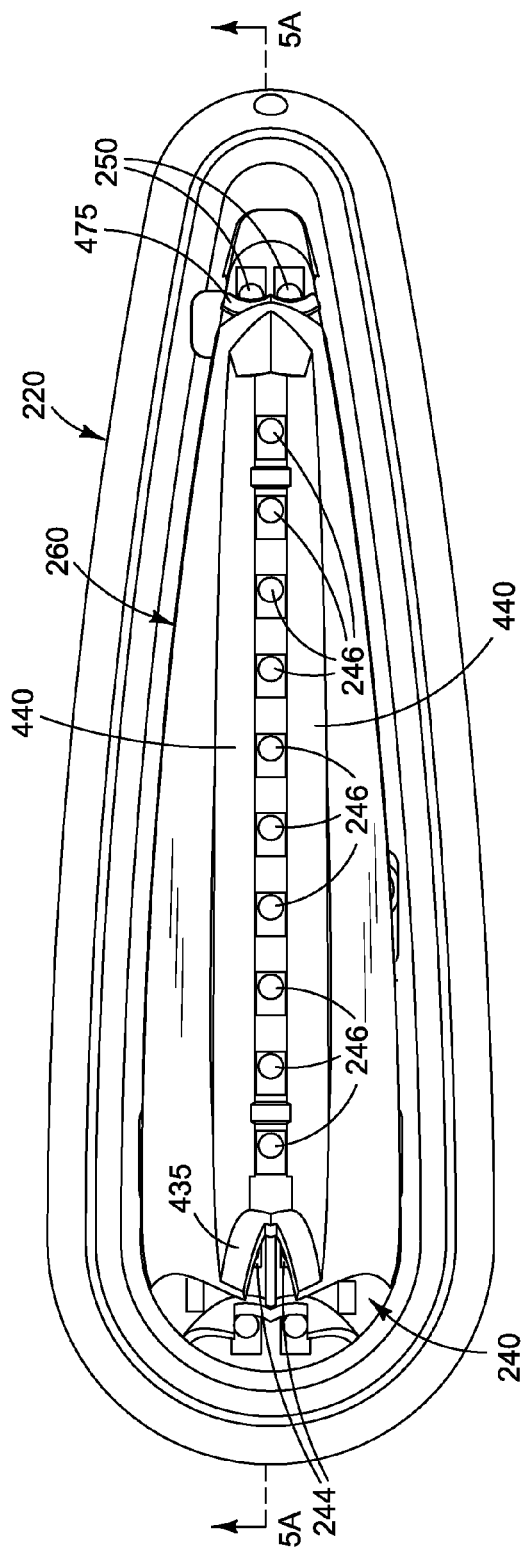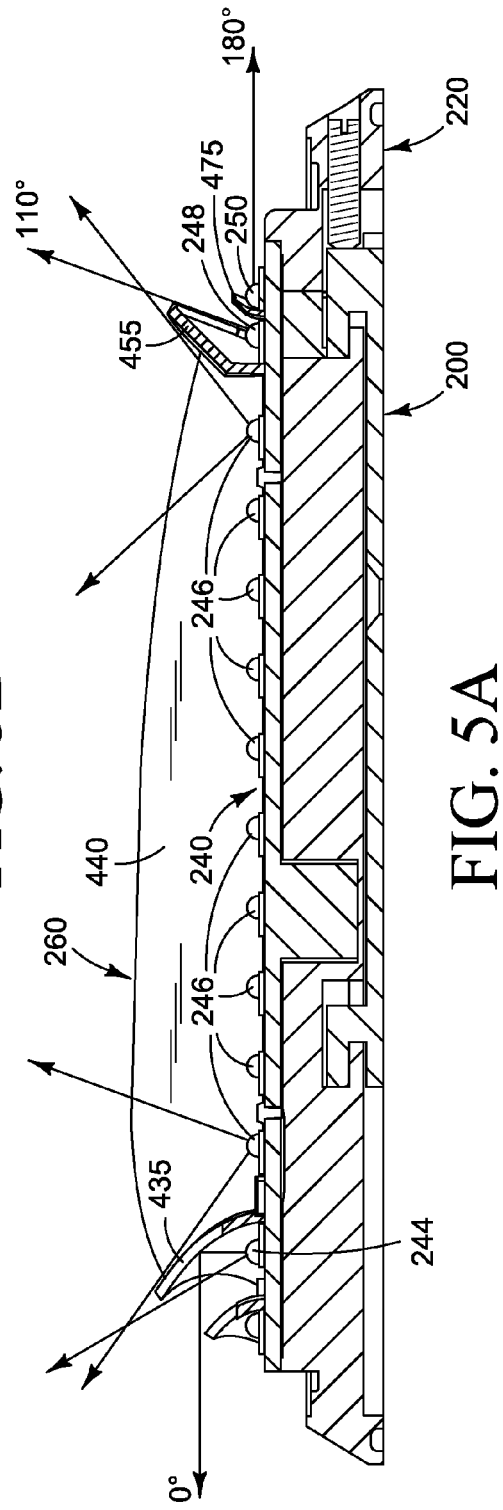

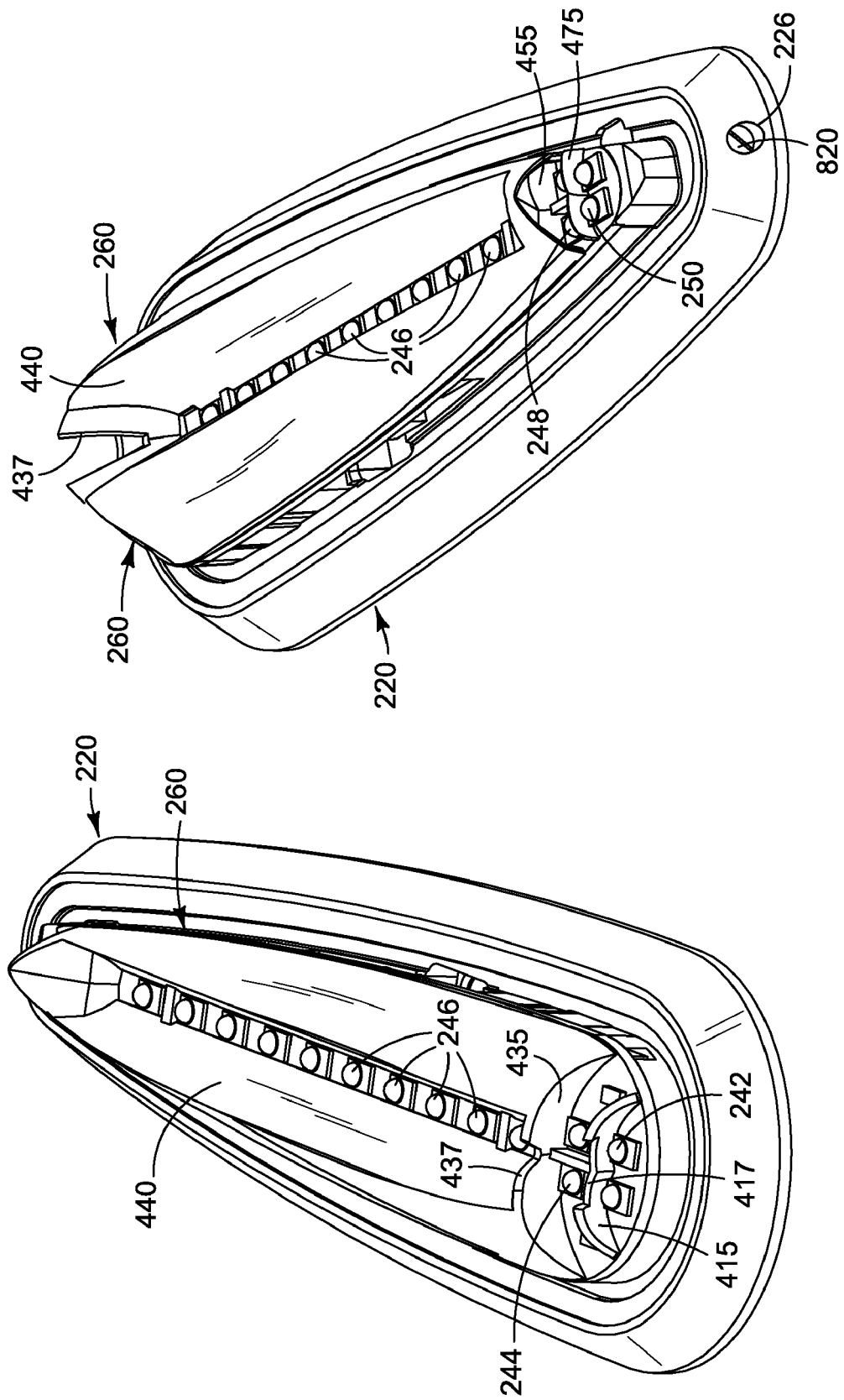

AIRCRAFT NAVIGATION LIGHT

CROSS REFERENCE TO RELATED APPLICATIONS

Not applicable.

FEDERALLY SPONSORED RESEARCH OR DEVELOPMENT

Not applicable.

JOINT RESEARCH AGREEMENT

Not applicable

SEQUENCE LISTING

Not applicable

FIELD OF THE INVENTION

The present invention relates to the field of warning lighting and in particular to aircraft navigation lights.

BACKGROUND OF THE INVENTION

External aircraft lights, broadly speaking, fall into two main categories. The first is for the purpose of illuminating the space around the aircraft to improve visibility for the pilot, of which landing lights are an example. The second is to act as warning lights for the purpose of providing a visible warning of the aircraft's presence to observers both on the ground and in other aircraft. Essentially, there are three types of external aircraft warning lights: strobe lights, position lights and colored navigation lights. Strobe lights are intended to attract the attention of observers, especially in low light conditions and, accordingly, these lights are designed to emit very bright light all around the aircraft and are usually pulsed so that they flash at between about 40 to 100 times a minute. In addition to the necessity of emitting light all around the aircraft, regulations imposed by the relevant national governing aviation bodies stipulate that there should be a low divergence in the vertical plane. Accordingly, warning lights ideally emit light in a substantially horizontal disk pattern.

Once an observer is made aware of the presence of an aircraft by its warning lights, the colored navigation lights provide an indication of the orientation of the aircraft. Typically, an aircraft carries a green colored navigation light on the starboard side, and a red colored navigation light on the port side. These colored lights are in addition to the white position lights and white strobe lights. Warning lights are typically located on the end of the wings and on the tail of an airplane. The colored navigation lights and position lights are less bright than the strobe lights and are generally illuminated continuously in use.

In contrast with the strobe lights which are required to be visible around 360 degrees in a horizontal plane, both the horizontal and vertical distribution of emitted light from position and navigation lights are important. This is because each type of warning light is required to emit light in a horizontal plane around the aircraft and at a minimum intensity which varies according to angular direction. For example, the red and green lights are not only required to emit bright light directly forward from the aircraft, but are also required to emit light to the port side and the starboard side respectively, albeit of a lower minimum intensity than in the forward direction. The white position lights are required to be visible from the rear of the aircraft and also to the port and starboard sides.

SUMMARY

In one embodiment, a base holds a single, planer, circuit board in thermal contact with the base. A number of colored and white LEDs mount on the circuit board facing away from the base. A reflector-shade sits adjacent the LEDs and is adapted to reflect light from the LEDs in desired directions and shade other directions from view of selected LEDs. A light transmissive cover adhesively seals to the base, enclosing the LEDs and reflector-shade in the space between the base and the light transmissive cover.

In another embodiment the aircraft navigation light has an encapsulating material sealing the aircraft navigation light while another embodiment includes a heat conductive material between the circuit board and the base. Yet another embodiment includes an inert atmosphere inside the space formed between the base and light transmissive cover.

In other embodiments the light transmissive cover includes a lenticular lens to direct the light from the LEDs in specific directions and at specific angles. In still other embodiments, portions of the reflector-shade are in the shape of a linear parabolic reflector to reflect light in desired directions.

Some embodiments control the LED current to be inversely related to the temperature of the LEDs to reduce the temperature of the LEDs and other components. Other embodiments include circuitry providing a pulsating current to a portion of the LEDs to create a strobe effect. Still other embodiments include an adapter configured to mount onto an aircraft. The base is adapted to slidingly fit onto the adapter with a fastener configured to lock the base onto the adapter.

In further embodiments, the base is adapted to receive the circuit board in close thermal contact to aid heat transfer from the circuit board to the base.

BRIEF DESCRIPTION OF DRAWINGS

The summary above, and the following detailed description will be better understood in view of the enclosed drawings which depict details of preferred embodiments. Like reference numbers designate like elements. It should however be noted that the invention is not limited to the precise arrangement shown in the drawings. The features, functions and advantages can be achieved independently in various embodiments of the claimed invention or may be combined in yet other embodiments.

FIGS. 4A and 4B show profile and plan views of one embodiment of the reflector shade within the aircraft navigation light.

FIGS. 5A and 5B show profile and plan views of one embodiment of the reflector shade within the aircraft navigation light.

FIGS. 6A and 6B show perspective views of embodiments of the aircraft navigation light.

DETAILED DESCRIPTION

In the following description, reference is made to the accompanying drawings that form a part thereof, and in which is shown by way of illustration specific exemplary embodiments in which the invention may be practiced. These embodiments are described in sufficient detail to enable those skilled in the art to practice the invention, and it is to be understood that modification to the various disclosed embodiments may be made and other embodiments may be utilized, without departing from the spirit and scope of the present invention. The following detailed description is therefore, not to be taken in a limiting sense.

Figure 1A:
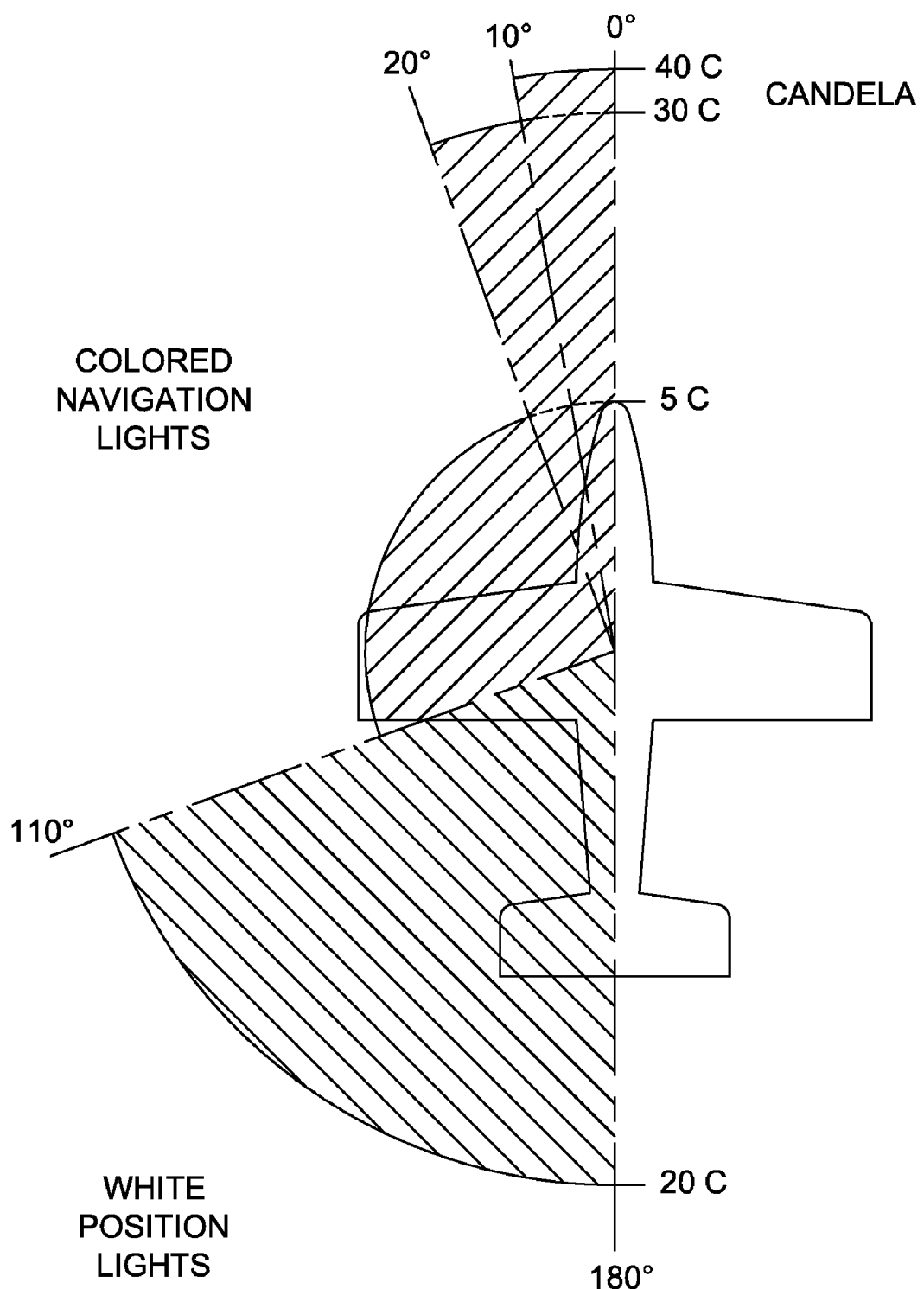
FIG. 1A shows a pictorial summary of the light pattern required for colored navigation and white position lights relative to the aircraft.

FIG. 1A shows a pictorial summary of the light pattern required for colored navigation and white position lights relative to the aircraft. The major axis of the aircraft runs from 0 degrees to 180 degrees, nose to tail. The pattern of FIG. 1A is in the horizontal plane. The colored navigation lights must be visible from 0 degrees to 110 degrees. The luminous intensity of the colored navigation lights are a minimum of 40 candela from 0 to 10 degrees, 30 candela from 10 to 20 degrees, and 5 candela from 20 to 110 degrees. The luminous intensity of the white position lights is 2 candela from 110 to 180 degrees. FIG. 1A shows the requirements for the left or port side of the aircraft. The requirements for the right or starboard side of the aircraft are the same and have been omitted for clarity. The color of the port side navigation lights is aviation red, while the color of the starboard side navigation lights is aviation green. The exact color is defined by national aviation authorities.

Figure 1B:
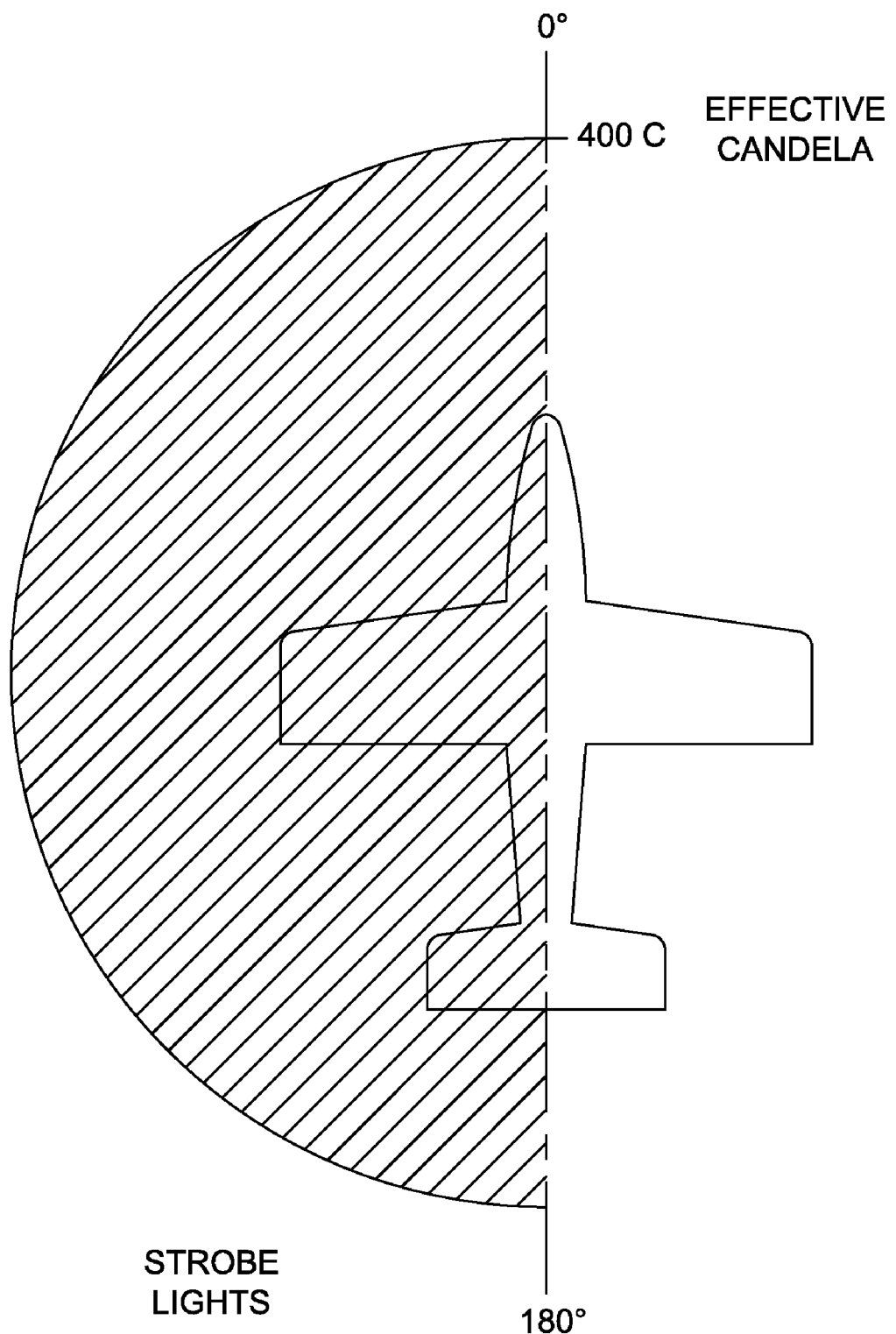
FIG. 1B shows a pictorial summary of the light pattern required for strobe lights relative to the aircraft.

FIG. 1B shows a pictorial summary of the light pattern required for the strobe lights relative to the aircraft. The major axis of the aircraft runs from 0 degrees to 180 degrees, nose to tail. The pattern of FIG. 1B is in the horizontal plane. The strobe lights must be visible from 0 degrees to 180 degrees. The luminous intensity of the strobe lights is a minimum of 400 effective candela from 0 to 180 degrees. The effective candela is defined by national aviation standards and depends upon luminous intensity, duration and period of the strobe. National aviation illumination standards are well known to those skilled in the art.

Figure 1C:
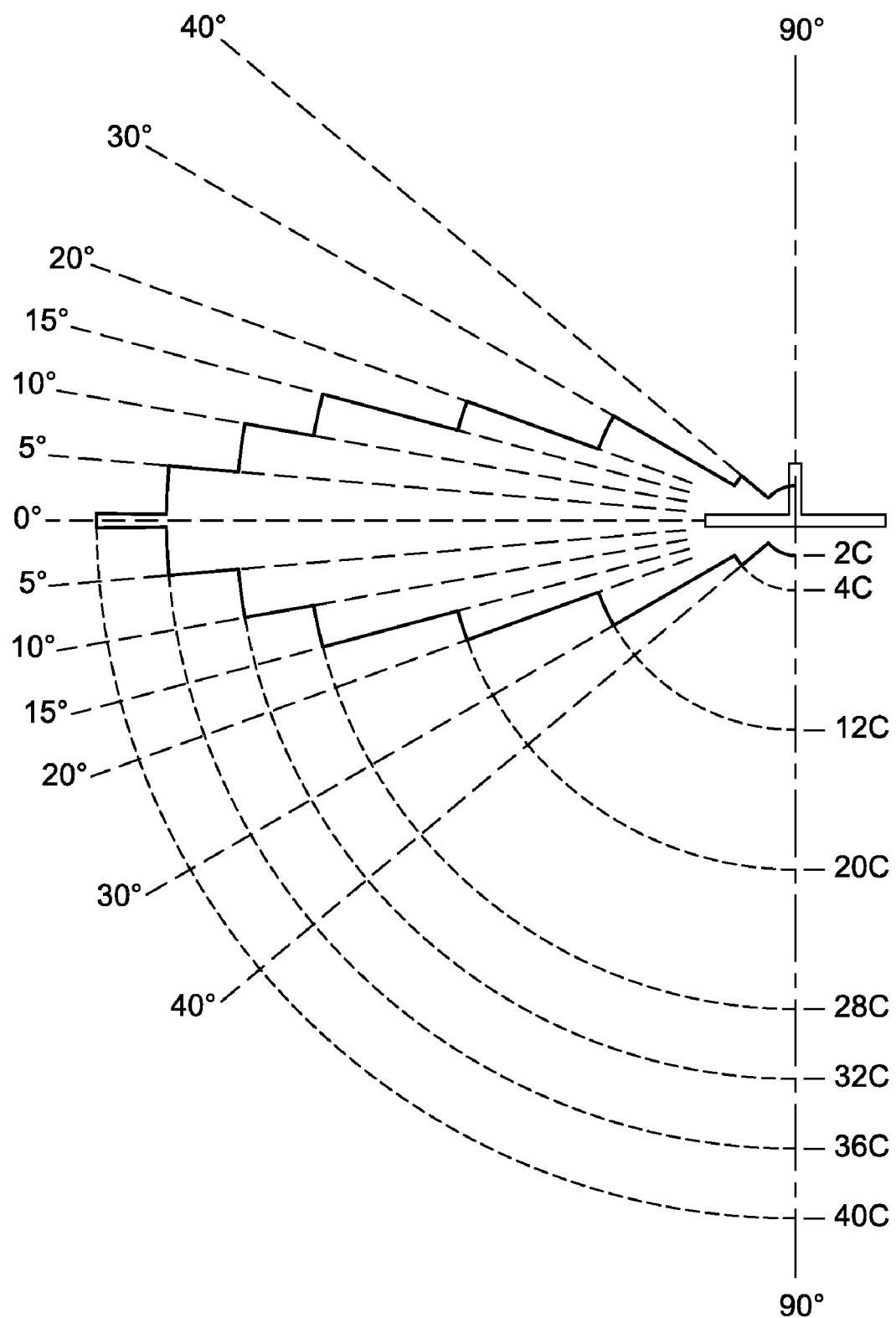
FIG. 1C shows a pictorial summary of the vertical light pattern required for colored navigation lights and white position lights relative to the aircraft.

FIG. 1C Fig. shows a pictorial summary of the light pattern required for colored navigation and white position lights relative to the aircraft. The pattern of FIG. 1C is in a vertical plane passing through the aircraft navigation light. The vertical plane is further perpendicular to the major axis of the aircraft. The luminous intensity of the colored navigation lights and position lights are a minimum of 40 candela in the horizontal plane of the aircraft at 0 degrees, 36 candela from 0 to 5 degrees, 32 candela from 5 to 10 degrees, 28 candela from 10 to 15 degrees, 20 candela from 15 to 20 degrees, 12 candela from 20 to 30 degrees, 4 candela from 30 to 40 degrees, and 2 candela from 40 to 90 degrees. FIG. 1C shows the requirements for the left or port side of the aircraft. The requirements for the right or starboard side of the aircraft are the same and have been omitted for clarity.

Figure 1D:
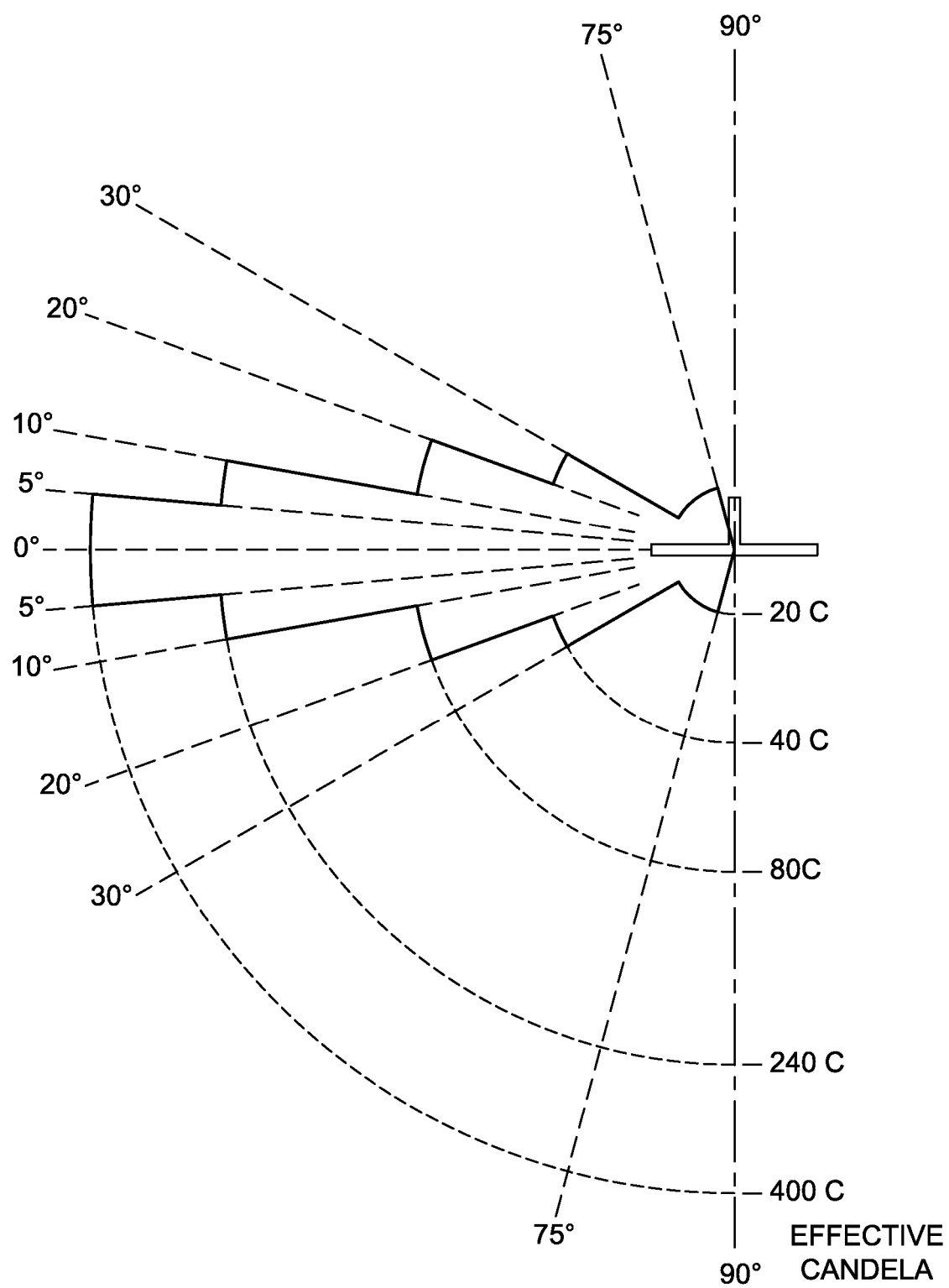
FIG. 1D shows a pictorial summary of the vertical light pattern required for strobe lights relative to the aircraft.

FIG. 1D Fig. shows a pictorial summary of the light pattern required for strobe lights relative to the aircraft. The pattern of FIG. 1D is in a vertical plane containing the aircraft navigation light. The vertical plane is further perpendicular to the major axis of the aircraft. The luminous intensity of the strobes lights is a minimum of 400 effective candela from 0 to 5 degrees, 240 effective candela from 5 to 10 degrees, 80 effective candela from 10 to 20 degrees, 40 effective candela from 20 to 30 degrees, and 20 effective candela from 30 to 75 degrees. FIG. 1D shows the requirements for the left or port side of the aircraft. The requirements for the right or starboard side of the aircraft are the same and have been omitted for clarity.

Figure 2:
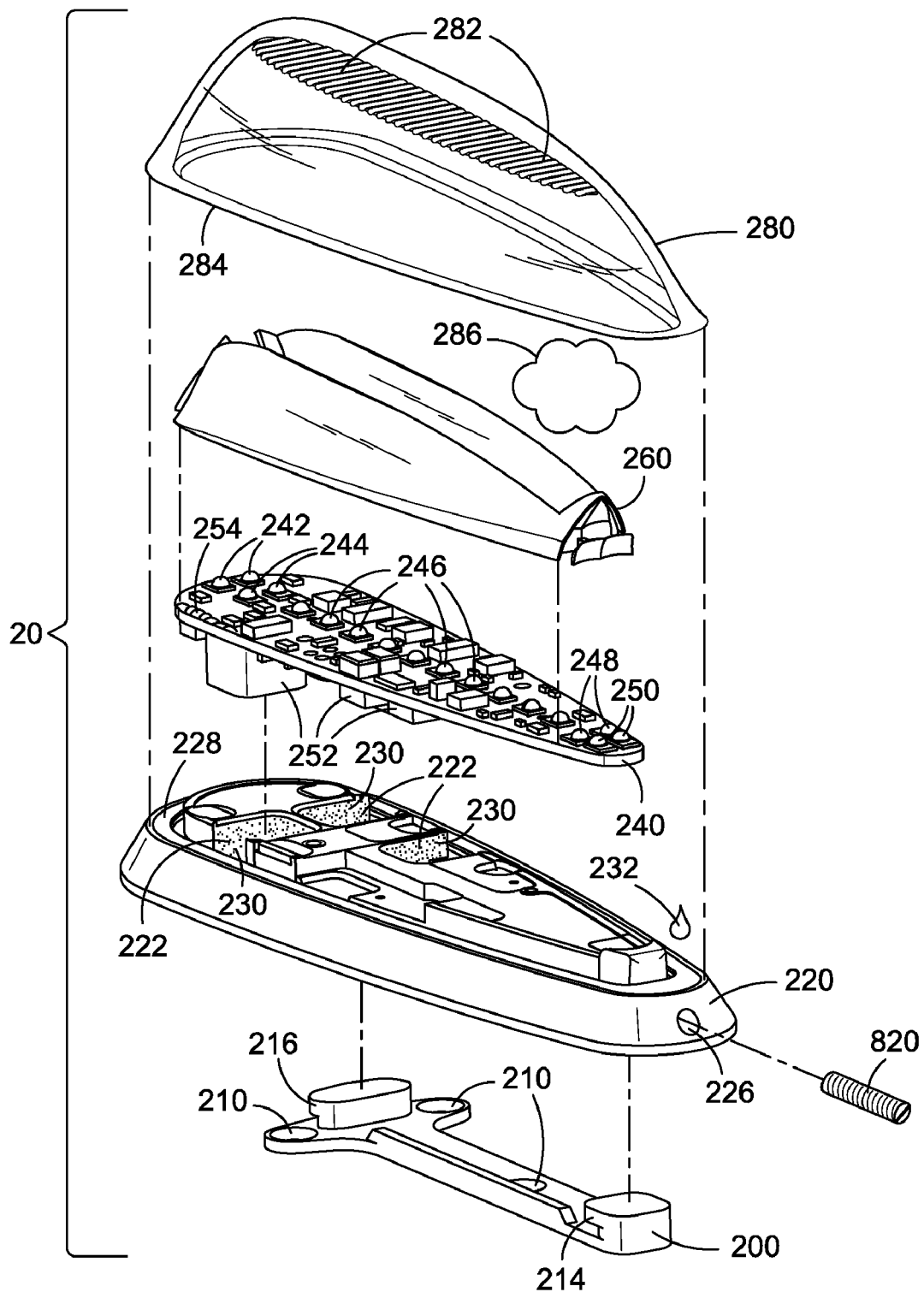
FIG. 2 shows an exploded view of one embodiment of the aircraft navigation light.

FIG. 2 shows an exploded view of one embodiment of the aircraft navigation light 20. An adapter 200 has mounting holes 210 configured to attach the adapter 200 to an aircraft. The arrangement and number of the holes 210 can vary to suit the type of aircraft. A base 220 is fitted to the adapter 200. The base 220 is adapted to receive a single planer circuit board 240 in close thermal contact. The circuit board 240 has a number of light emitting diodes (LEDs) 242, 244, 246, 248 and 250. LEDs 242 are colored aviation red or green. LEDs 244, 246, and 250 are white strobes lights while LEDs 248 are white position lights. The circuit board 240 also has other components. Any or all of the components on the circuit board 240 can be sealed with an encapsulating material 254 for protection. Recesses 222 in the base 220 are configured to receive components such as 252 on the underside of the circuit board 240. A heat conductive material 230 such as a gel, paste or compliant material between the circuit board 240 and base 220 improves heat flow from the circuit board 240 and components 252 into the base 220. A reflector-shade 260 fits onto the circuit board 240 above the LEDs 242-250. The reflector-shade 260 is adapted to reflect light from the LEDs 242-250 in desired directions and shade other directions from view of selected LEDs 242-250. A light transmissive cover 280 fits onto the base 220 enclosing the circuit board 240 and reflector-shade 260. An adhesive or sealant 232 placed between the edge 284 of the light transmissive cover 280 and a sealing lip 228 on the base 220 seals the light transmissive cover 280 to the base 220. A lenticular lens 282 in the light transmissive cover 280 further directs light from the LEDs 242-250 in desired directions. An inert atmosphere 286 is captured between the base 220 and light transmissive cover 280.

In operation, the base 220 of one embodiment of the aircraft navigation light 20 slidingly fits onto the adapter 200. Tabs 214 and 216 on the adapter 200 fit into receiving tabs (not shown) in the base 220. A fastener such as a set screw fits into a threaded hole 226 and is configured to lock the base 220 to the adapter 200. Power and control wires (not shown) run through a hole in the base 220 and connect to the circuit board 240. The recesses 222 in the base 220 are adapted to accommodate the components 252 on the underside of the circuit board 240. A heat conductive material 230 such as a gel, paste or compliant material placed between the components 252 and those portions of the base 220 defining the recesses 222 improves heat conduction from the components 252 to the base 220. Heat conduction material 230 placed between the circuit board 240 and the base 220 improves heat conduction from the circuit board 240 to the base 220. The recesses 222 increase the surface area between the components 252 and base 220 and improve heat transfer in addition to lowering the overall thickness of the assembled embodiment.

LEDs 242 are colored aviation red or aviation green while LEDs 244, 246, 248, and 250 are white. The reflector-shade 260 directs the light emitted from the colored LEDs 242 in the desired directions shown in FIGS. 1A and 1C. The reflector-shade 260 further shades other directions from view of the colored LEDs 242. LEDs 248 provide light for the white position lights. The reflector-shade 260 directs the white light emitted from the LEDs 248 in the desired directions shown in FIGS. 1A and 1C. The reflector-shade 260 further shades other directions from view of the white LEDs 248. LEDs 244, 246 and 250 provide light for the white strobe lights. The reflector shade 260 directs light emitted from LEDs 244, 246, and 250 in the desired directions shown in FIGS. 1B and 1D. More detail of the reflector-shade 260 follows in the discussion of other figures.

The light transmissive cover 280 seals to the base 220 enclosing the reflector-shade 260 and circuit board 240. The seal between the light transmissive cover 280 and base 220 can be achieved with an adhesive 232 between the edge 284 of the light transmissive cover 280 and a sealing lip 228 on the base 220. Other sealing methods are possible. The space between the light transmissive cover 280 and base 220 can further hold an inert atmosphere 286 such as dry nitrogen or other suitable gas. An inert atmosphere 286 can reduce corrosion of the circuit board 240 and components on either side of the circuit board 240. Lenses such as a lenticular lens 282 in the light transmissive cover 280 further directs light in the desired directions shown in FIGS. 1A-1D.

Figure 3:
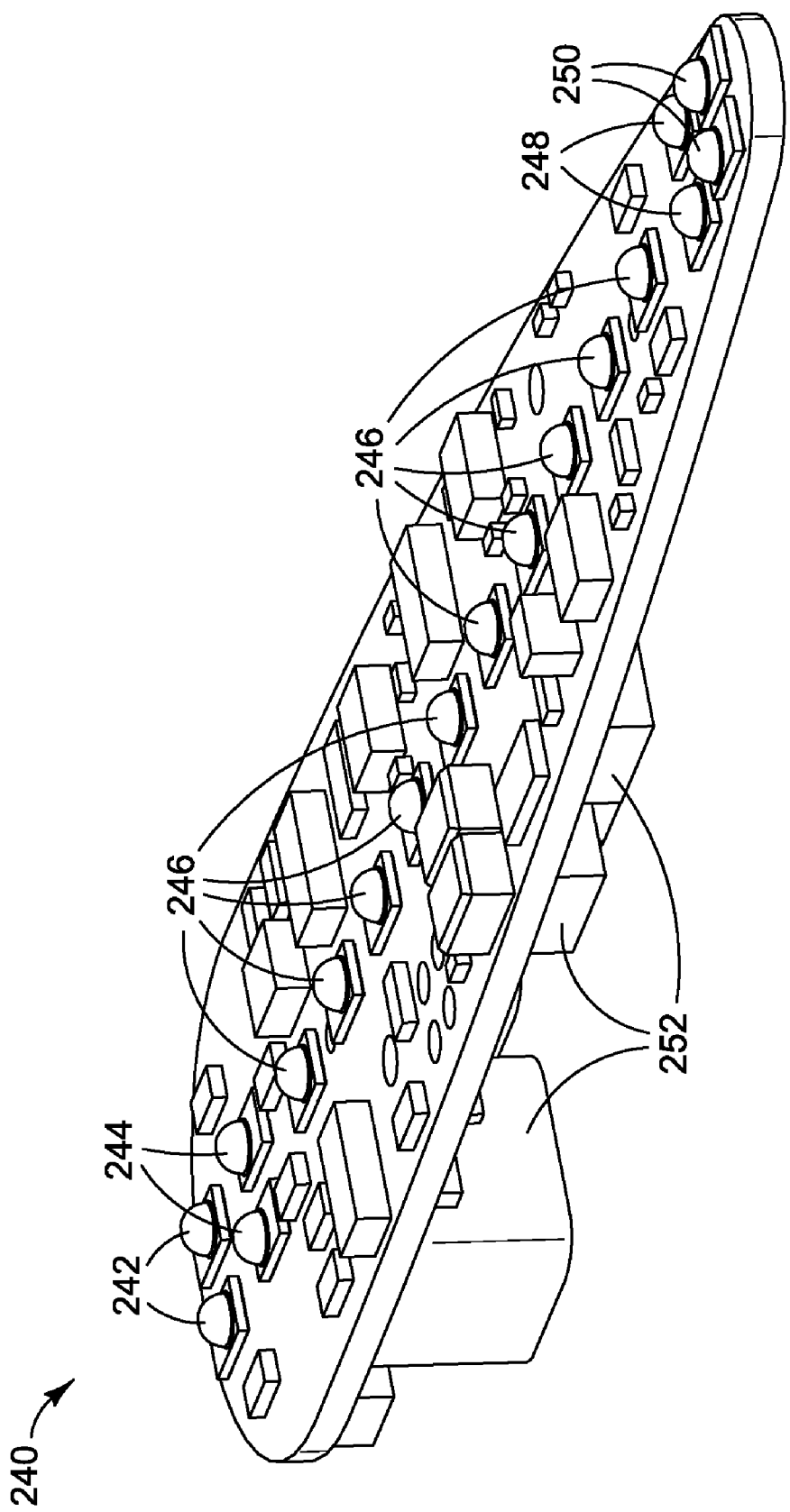
FIG. 3 shows a detailed view of one embodiment of the circuit board of the aircraft navigation light.

FIG. 3 shows one embodiment of the circuit board 240. The LEDs 242-250 mount on the side of the circuit board 240 facing away from the base 220. Several components mount on either side of the printer circuit board 240. For the sake of clarity, only components 252 are explicitly numbered. The components act to regulate the current in the LEDs and control the strobe effects of LEDs 244, 246, and 250. The operation of the components is more fully described in conjunction with another figure describing some aspects of circuit operation. The circuit board 240 uses metal layers, plated holes and other techniques to transfer heat from various components to the base 220. The circuit board 240 can further have alignment holes or notches to position the reflector-shade 260 above the LEDs. Alignment pins or tabs on the reflector-shade 260 fit into corresponding holes or notches in the circuit board. Light emitted from the LEDs shines onto the reflector-shade 260 and is directed in desired directions.

FIGS. 4A and 4B show one embodiment of the reflector-shade 260. Several reflectors 415, 435, 440, 455 and 475 exist on the reflector-shade 260. Reflector 415 has a notch 417 and reflector 435 has a notch 437. The reflector 440 is approximately linear parabolic and is shaped to direct the light emitted from LEDs 246 in the desired directions. The LEDs 242, 246, 248 and 250 have an emission pattern that is approximately lambertian. In some embodiments the reflector-shade 260 is made from a single piece of material and has reflective surfaces. The reflector-shade 260 can be made of a single piece of injection molded plastic and metalized to provide reflective surfaces or it can be assembled from stamped metal pieces. Other manufacturing methods are possible.

In operation the reflector-shade 260 of FIGS. 4A and 4B directs reflect light from the LEDs in desired directions and shades other directions from view of selected LEDs. Reflector-shade 260 has several reflectors, 415, 425, 440, 455 and 475. In FIG. 4A reflector 415 directs the light emitted from colored LEDs 242 forward at an angle of 0 degrees to an angle of 110 degrees. In FIG. 4B a notch 417 in reflector 415 and a V-shaped notch 437 in reflector 435 permits light from colored LEDs 242 to project back at an angle of 110 degrees but not substantially further. The width and shape of the notches determine the horizontal and vertical angles of the light. Reflective areas of the reflectors 415 and 435 facing the LEDs 242 reflect the light from colored LEDs 242 in the desired directions as described in FIGS. 1A and 1C. At the same time the reflective areas of the reflectors 415 and 435 shade or block other directions from view of the LEDs. This shading function acts to direct the light from colored LEDs 242 in the desired directions as described in FIGS. 1A and 1C.

Reflector 455 directs the light emitted from the white position light LEDs 248. Reflector 455 constrains the light from LEDs 248 to fall within the indicated angle of 110 to 180 degrees as shown in FIG. 4A. The height and shape of reflector 455 enables the light from LEDs 248 to travel over the top of reflector 475 reaching the 180 degree angle as shown.

FIGS. 5A and 5B show one embodiment of the reflector-shade 260. Several reflectors 415, 435, 440, 455 and 475 exist on the reflector-shade 260. Reflectors 435, 440 and 475 reflect the light used for the white strobe function. Reflector 435 reflects the light from white LEDs 244, reflector 440 reflects the light from LEDs 246 and reflector 475 reflects the light from LEDs 250. The reflector 440 is approximately linear parabolic and is shaped to direct the light emitted from LEDs 246 in the desired directions. The LEDs 244, 246 and 250 have an emission pattern that is approximately lambertian.

In operation the reflector-shade 260 of FIGS. 5A and 5B directs reflect light from the LEDs in desired directions, Reflector-shade 260 uses reflectors, 435, 440, and 475 for the white LEDs of the strobe function. In FIG. 5A reflector 435 directs the light emitted from white LEDs 244 forward at an angle of 0 degrees to an angle of less than 90 degrees. The reflector 475 directs the light emitted from white LEDs 250 rearward at an angle of 180 degrees to an angle of less than 90 degrees. The angles of light emitted from LEDs 246 overlap the light emitted by LEDs 244 and 250. Taken together, the light from LEDs 244, 246 and 250 cover the range of 0 degrees to 180 degrees. The reflectors 435, 440 and 475 reflect and constrain the light emitted from the LEDs 244, 246 and 250 to conform to the emission patterns described in FIGS. 1B and 1D.

The size and shape of the reflectors 415, 435, 440, 455 and 475 as well as the notches 415 and 437 can be determined in several ways. The reflector design is based on the emission pattern of the LEDs 242, 244, 246, 248 and 250 as well as the desired final emission pattern of the aircraft navigation light. Starting with the desired emission pattern such as shown in FIGS. 1A through 1D, together with the emission pattern and intensity of individual LEDs, one skilled in the art, after reviewing this disclosure, can design a reflector-shade. Without undue experimentation, one skilled in the art can use classical graphical techniques or computer automated design programs to determine the size and shape of each reflector and notch as well as the number of LEDs.

FIGS. 6A and 6B show front and rear perspective views respectively of the embodiments shown and described in conjunction with FIGS. 4A-4B and 5A-5B.

Figure 7:
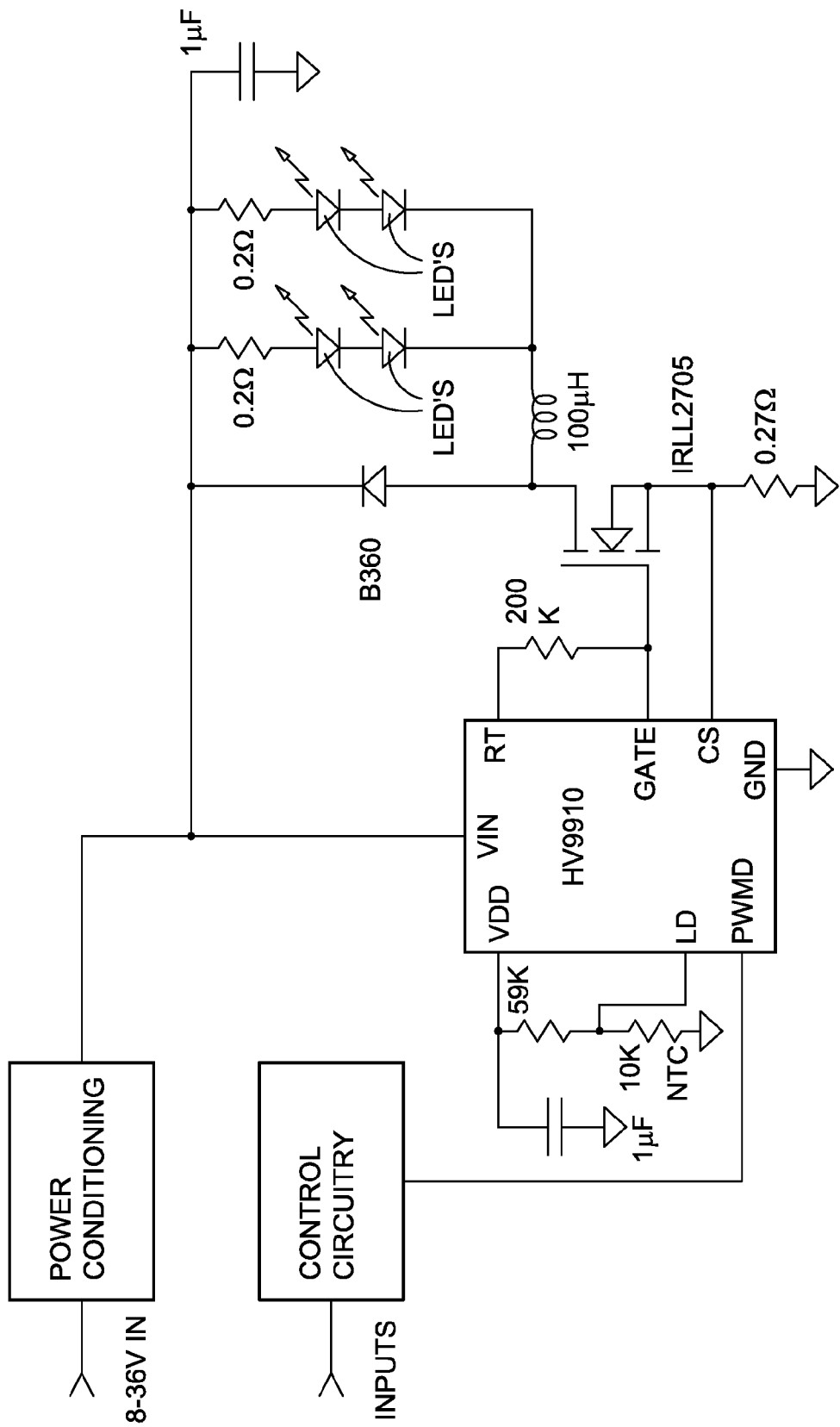
FIG. 7 shows one embodiment of LED current regulation circuitry of the aircraft navigation light.

FIG. 7 shows one embodiment of LED current regulation circuitry of the aircraft navigation light. The circuit employs an LED driver control integrated circuit (IC) such as the HV9910 manufactured by Supertex, Inc. of Sunnyvale, Calif. The power conditioning block filters undesired electrical noise and potentially damaging voltage and current surges. The IC inputs the power on the Vin pin and outputs a regulated voltage at the Vdd pin. A 200K ohm resistor at the RT pin controls the internal oscillator of the IC. The Gate output pin turns on and off the IRLL2705 transistor and therefore current through the associated 100 micro Henry inductor and diode B360. The resulting regulated current flows through the LEDs and 0.2 ohm resistors. The 0.27 ohm resistor converts the current to a voltage sensed by the current sense (CS) input of the IC. The IC regulates the current based on the voltage sensed at CS. The voltage at the LD input of the IC sets the amount of current provided by the IC to the LEDs. A higher voltage dictates a higher LED current while a lower voltage results in a lower current. The voltage at the LD input is controlled by a voltage divider of a 59K ohm resistor and 10K negative temperature coefficient (NTC) resistor fed by the regulated voltage provided at Vdd. The control circuitry connected to the IC PWMD input controls whether the LEDs are on or off. By switching the PWMD input off and on, the control circuitry can produce a pulsating current for flashing the LEDs to create a strobe effect. The 1 micro farad (1 uF) capacitors act to reduced alternating current ripple in the associated circuits.

In operation the Vdd output pin provides a regulated voltage of 7.5 volts to the resistor divider composed of the 59K and 1 OK NTC resistors. At 25 degrees Celsius the resulting voltage is over 1 volt at the LD input which directs the IC to provide full current to the LEDs based on the 0.27 ohm sense resistor. As the temperature increases, the resistance of the 1 OK NTC resistor falls. This action causes the voltage to fall at the LD input. When the voltage falls below 0.25 volts, the IC reduces the current to the LEDs. Higher temperatures of the 10K NTC result in lower currents to the LEDs. Consequently, the magnitude of the LED current is inversely related to the temperature of the LEDs.

In practice the IC and the 10K NTC reside on the circuit board 240. The temperature of the 10K NTC closely follows the temperature of the LEDs. High temperatures can damage, shorten the life of, or affect the reliability of the LEDs and other components. One of the major causes of LED temperature is the current through the LEDs. Higher currents cause higher temperatures. The circuit described in FIG. 7 protects the LEDs by reducing the current at higher temperatures. This approach increases the reliability and longevity of the aircraft navigation light. High temperatures are not uncommon in situations where the aircraft is taxiing on the ground on a hot day in direct sunlight. Under these conditions, the circuit of FIG. 7 acts to reduce the LED current to the LEDs. Once the aircraft is airborne, the airstream acts to cool the base 220 of the aircraft navigation light 20 and therefore the LEDs and associated circuitry. The LEDs can then return to full current and brightness as the 10K NTC cools along with the LEDs.

While a particular integrated circuit (IC) and circuit was shown in FIG. 7, those skilled in the art, after reading this disclosure, will realized that several variations are possible. For example several commercially available LED driver and pulse width modulator integrated circuits are available. Other types of temperature sensing can also be employed. Additionally, the function of LED current inversely related to temperature can also be realized by discrete components.

Figure 8:
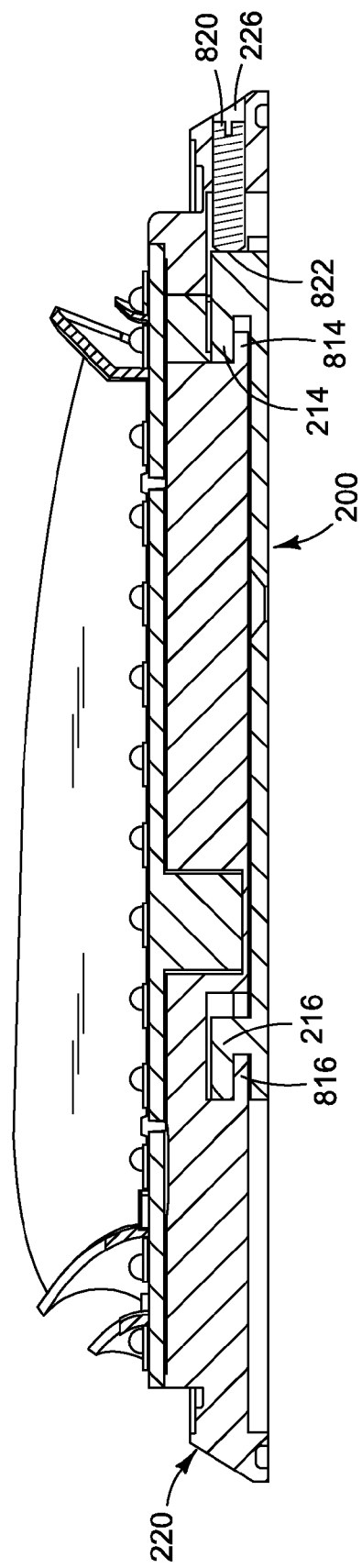
FIG. 8 is a section view of one embodiment of a base fitted to an adapter.

FIG. 8 shows a section view of one embodiment of the base 220 fitted to the adapter 200. The adapter 200 is mounted to an aircraft (not shown). "L" shaped tabs 214 and 216 of the adapter 200 fit into the base 220. "L"-shaped receiver tabs 814 and 816 are adapted such that the base 220 is slidingly fitted to the adapter 200. A single fastener 820 in threaded hole 226 pushes on a portion 822 of the adapter 200. This action constrains the tabs 214 and 216 to remain in engagement with the receiving tabs 814 and 816 such that the base 220 locks to the adapter 200. In summary, a single fastener 820 in the base 220 locks the base 220 to the adapter 200. This configuration enables different adapters to be used with a common base while each adapter may be configured for specific aircraft. The nearly hidden fastener 820 located in a threaded hole 226 in the base 220 provides for a smooth, clean design and avoids a multiplicity of external visible screws. Other types of fasteners and locking mechanisms can also be used and are known to those skilled in the art.

Figure 9:
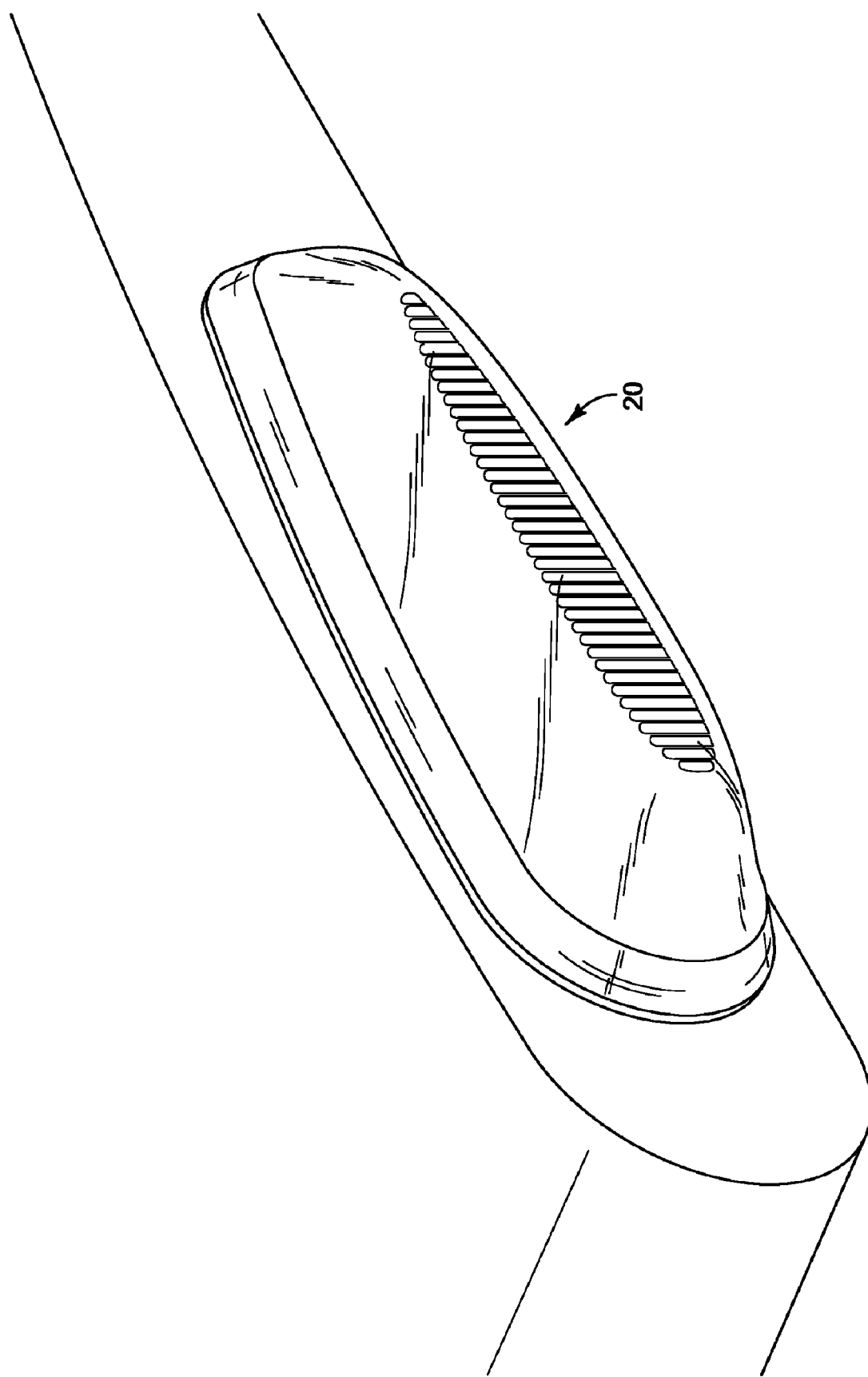
FIG. 9 is a perspective view of one embodiment of the aircraft navigation light on the wing of an aircraft.

FIG. 9 is a perspective view of one embodiment of the aircraft navigation light 20 on the wing of an aircraft. The aircraft wing is shown in dashed lines.

Although this invention has been described in terms of certain preferred embodiments, other embodiments that are apparent to those of ordinary skill in the art, including embodiments that do not provide all of the features and advantages set forth herein, are also within the scope of this invention. Rather, the scope of the present invention is defined only by reference to the appended claims and equivalents thereof.

We claim:

1. An aircraft navigation light comprising:
   a base;
   a, circuit board in thermal contact with the base;
   a plurality of colored LEDs mounted on the circuit board;
   a plurality of white LEDs mounted on the circuit board;
   a reflector-shade, wherein a portion of the reflector-shade is a linear parabolic reflector, placed adjacent the LEDs adapted to reflect light from the LEDs in desired directions and shade other directions from view of selected LEDs; and
   a light transmissive cover sealed to the base, enclosing the circuit board, LEDs and reflector-shade between the base and the light transmissive cover.

2. The aircraft navigation light of claim 1 further comprising an encapsulating material sealing the aircraft navigation light.

3. The aircraft navigation light of claim 1 wherein the light transmissive cover further includes a lenticular lens.

4. The aircraft navigation light of claim 1 further comprising a heat conductive material between the circuit board and base.

5. The aircraft navigation light of claim 1 further comprising an inert atmosphere between the light transmissive cover and the base.

6. The aircraft navigation light of claim 1 further comprising circuitry providing current to the LEDs, the magnitude of the current inversely related with the temperature of the LEDs.

7. The aircraft navigation light of claim 1 wherein the colored LEDs emit at least one of the colors aviation red and aviation green.

8. An aircraft navigation light comprising:
   an adapter configured to mount to an aircraft;
   a base fitted to the adapter;
   a fastener in the base configured to lock the base to the adapter;
   a circuit board in thermal contact with the base;
   a plurality of colored LEDs mounted on the circuit board;
   a plurality of white LEDs mounted on the circuit board;
   a reflector-shade, wherein a portion of the reflector-shade is a linear parabolic reflector, placed adjacent the LEDs adapted to reflect light from the LEDs in desired directions and shade other directions from view of selected LEDs; and
   a light transmissive cover adhesively sealed to the base, enclosing the circuit board, LEDs and reflector-shade between the base and the light transmissive cover.

9. The aircraft navigation light of claim 8 further comprising an encapsulating material sealing the aircraft navigation light.

10. The aircraft navigation light of claim 8 wherein the base is in thermal contact with the adapter.

11. The aircraft navigation light of claim 8 wherein the light transmissive cover further includes a lenticular lens.

12. The aircraft navigation light of claim 8 further comprising a heat conductive material between the circuit board and the base.

13. The aircraft navigation light of claim 8 further comprising an inert atmosphere within the space defined by the light transmissive cover and the base.

14. The aircraft navigation light of claim 8 further comprising circuitry providing current to the LEDs, the magnitude of the current inversely related with the temperature of the LEDs.

15. The aircraft navigation light of claim 8 wherein the colored LEDs emit at least one of the colors aviation red and aviation green.

16. An aircraft navigation light comprising:
   an adapter configured to mount to an aircraft;
   a circuit board;
   a base fitted to the adapter the base further adapted to receive the circuit board in close thermal contact;
   a fastener configured to lock the base to the adapter;
   a heat conductive material interposed between the circuit board and the base;
   a plurality of colored LEDs mounted on the circuit board;
   a plurality of white LEDs mounted on the circuit board;
   a single piece reflector-shade, a portion of which is linear parabolic, placed adjacent the LEDs to reflect light from the LEDs in desired directions and shade other directions from view of selected LEDs; and
   a lenticular lens cover adhesively sealed to the base, enclosing the circuit board, LEDs and reflector-shade between the base and the lenticular lens cover.

17. The aircraft navigation light of claim 16 further comprising circuitry providing current to the LEDs, the magnitude of the current inversely related with the temperature of the LEDs.

18. The aircraft navigation light of claim 16 further comprising circuitry providing a pulsating current to a portion of the LEDs, to create a strobe effect.

19. The aircraft navigation light of claim 16 further comprising an inert atmosphere enclosed between the lenticular lens cover and the base.

* * * * *